April 25, 1944.    R. D. BENNETT    2,347,238
SEQUENCE VALVE
Filed Dec. 26, 1941
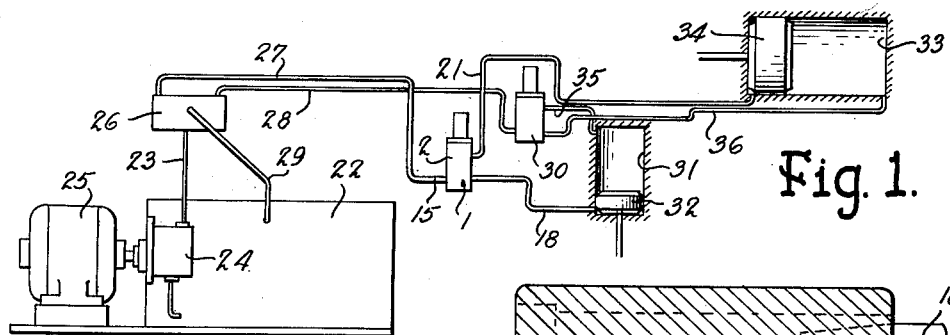
Fig. 1.
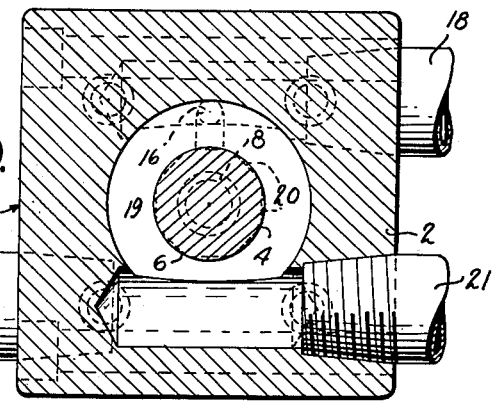
Fig. 3.
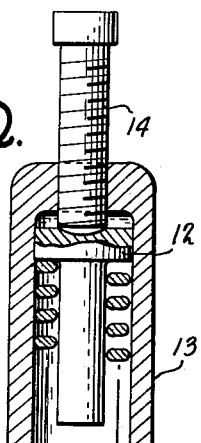
Fig. 2.
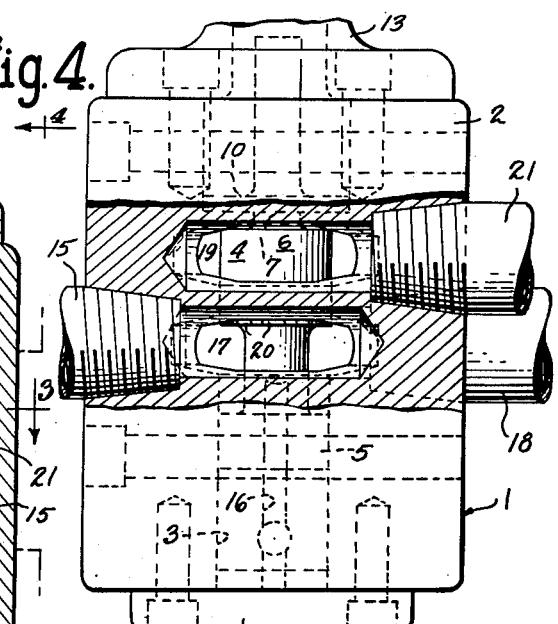
Fig. 4.
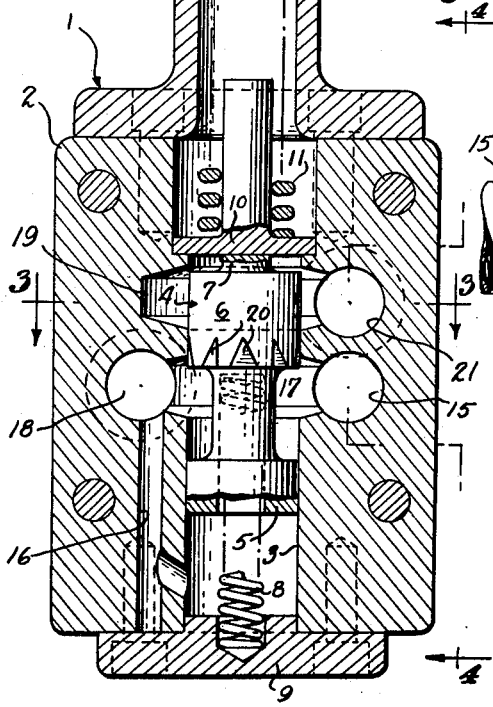
INVENTOR.
Racy D. Bennett
BY
Attorney Patented Apr. 25, 1944

2,347,238

UNITED STATES PATENT OFFICE 2,347,238

SEQUENCE VALVE

Racy D. Bennett, Detroit, Mich., assignor to Vinco Corporation, Detroit, Mich., a corporation of Michigan Application December 26, 1941, Serial No. 424,485

8 Claims. (Cl. 137—153)

This invention relates to hydraulic valves of the type in which several hydraulic circuits are to be controlled according to a predetermined sequence of operation. The valve has applicability, for instance, for operating a clamp on a machine having a hydraulic ram where it is necessary that the clamp be closed before the ram starts. It has numerous other applications where sequential operation is desired.

It is a principal object of the invention to provide a 4-way sequence valve device which will remain open so long as pressure is maintained regardless of whether there is flow of fluid therethrough.

Another object is to provide a valve device of this type incorporating a spool valve which will respond to pressure for shifting positions and which will maintain any position until an actual pressure shift occurs.

A further object is to provide a valve device of this character having a valve therein of the slide type which will be less susceptible to the presence of dirt particles than conventional valves and which will, therefore, be more reliable in prompt and effective operation.

Other objects and advantages will become more fully apparent as reference is had to the accompanying drawing wherein my invention is illustrated, and in which Fig. 1 diagrammatically represents an example of a complete hydraulic system having my improved valve device incorporated therein;

Fig. 2 is a longitudinal diametric section through the valve device,

Fig. 3 is a transverse radial section taken along the line 3—3 of Fig. 2, and

Fig. 4 is a side elevation of a portion of the valve with a broken section taken along the line 4—4 of Fig. 2.

More particularly, 1 indicates generally the sequence valve device forming the subject matter of this invention, which is composed of a valve housing 2 having central opening or bore 3 longitudinally therethrough, in which a spool valve 4 is slidably mounted. This valve has a piston-like end portion 5, a second piston-like portion 6 spaced therefrom and an upstanding projection 7. A spring 8 seats at one end in the housing head 9 and at its other end in a recess formed in the valve 4. The projection 7 is urged by the spring 8 into contact with a closure member 10 for the other end of the bore 3, the member 10 being urged against its seat by a spring 11 which seats thereagainst at one end and against a seat 12 at its other end. A spring housing 13 encloses the spring 11 and seat 12 and a set screw 14 through the outer end of this housing may be rotated to vary the stresses in the spring 11. The spring 11 offers greater resistance to displacement than does the spring 8.

The housing 2 has a fluid line 15 leading into one passageway 16 which connects into the bore 3 near the lower end thereof below the valve portion 5 and it also connects into the bore 3 at the chambered portion 17 between the valve portions 5 and 6. A pipe line 18 leads outwardly from the chamber 17. Immediately above the chamber 17 is a second chamber 19 which encircles the valve portion 6. The lower portion 6 has a plurality of triangular shaped indentations 20 in the lower surface thereof to permit a small initial flow upon opening of the chamber 17 to the chamber 19 which flow will gradually increase with increasing opening movement of the valve portion 6. The top of the portion 6 has slight normal clearance with the top of the chamber 19 so that there is constant communication between this chamber 19 and the spring seat 10. The chamber 19 has a pipe line 21 therefrom.

The operation of the valve will be explained with reference to the hydraulic system diagrammatically illustrated in Fig. 1 in which 22 indicates a reservoir having liquid therein adapted to be forced into a feed line 23 by a pump 24 driven by a motor 25. The line 23 leads into a control valve 26 adapted to divert the liquid under pressure either into a line 27 or a line 28 and to return liquid to the reservoir by way of the drain line 29. This control valve 26 may be of any desired construction and may be operated manually or according to a given cycle or according to a predetermined time mechanism, and it is preferably constructed according to the arrangement described in my co-pending application Serial No. 421,377, filed December 2, 1941.

The line 27 leads into the entry line 15 of a sequence valve 1 and the line 28 leads into another similar sequence valve 30. From the valve 1 the line 18 leads into one end of a cylinder 31 at one side of a piston 32 therein and the other line 21 leads into a second cylinder 33 at one side of a piston 34 therein. The other sequence valve 30 has a line 35 leading into the cylinder 31 at the other side of the piston 32 and a second line 36 leading into the cylinder 33 at the other side of the piston 34.

The piston 32 may be connected to any device or mechanism which must be actuated before the device or mechanism connected to the piston 34 is actuated, as, for instance, the piston rod of the piston 34 may be connected to a ram and the rod of the piston 32 may be connected to a clamp which must be fully closed before the piston 34 begins its actuating movement.

Now, suppose the parts are in the position shown. The control valve is shifted so that the line 27 is the pressure line and the line 28 is the drain line. Fluid under pressure enters the line 15 of the sequence valve 1, fills the passageway 16 and the space below the piston portion 5, and then fills the chamber 17 where it flows through the line 18 into the cylinder 31 below the piston 32. It drives the piston 32 upwardly, the valve 4 being maintained in the position illustrated by the spring 11. When the piston 32 reaches the upper limit of its stroke and offers fixed resistance to further movement the pressure in the line 27 and in the chamber 17, passage 16 and in the space below the valve 4 increases to the point where the valve 4 is elevated. The depressions 20 are progressively uncovered to the chamber 19 thus inletting fluid to that chamber where it will flow through the line 21 and into the cylinder 33 for actuation of the piston 34.

During the actuating movement of the piston 32 any fluid between this piston and the upper end of the cylinder 31 will be expelled through the line 35 where it will find access to the top of the valve 4. The spring 8, being relatively weak, will permit depression of the valve 4 so that the fluid flows into and through the chamber in the valve 30 corresponding to the chamber 19 of the valve device 1, outwardly through the line 28, through the control valve 26 and back into the reservoir by way of the drain line 29. When the control valve 26 is reversed the line 28 becomes the pressure line and the line 27 becomes the drain line whereupon the piston 34 will first be driven to the other end of the cylinder 33 and thereafter the piston 32 will be driven to the other end of its cylinder 31.

It will be noted that when the piston 32 is in its lower position and pressure is applied thereto through the line 18 so that upward movement of the piston 32 drives the fluid out of the line 35 that the valve in the device 30 corresponding to the valve 4 will be pressed downwardly to permit drainage out of the line 28. It will also be noted that pressure exerted in the chamber corresponding to the chamber 17 will be exerted in the line 36 which is in the direction of maintaining the piston 34 in pressure engagement with the end of its cylinder to prevent floating from that position. And, when the piston 32 reaches the top of its stroke so that the valve 4 opens to connect the pressure inlet 15 with the line 21, the inlet 15 remains in open communication with the line 18 so that pressure against this piston 32 is not relaxed during actuating movement of the other piston 34. A converse condition exists when the line 28 becomes the pressure line.

What is claimed is:

1. A sequence valve comprising a valve casing having a cylindrical opening therethrough, a spool valve in said opening a spring in said valve casing arranged to press said valve in one direction a resilient stop positioned to be engaged by said valve under pressure from said spring, said stop having a heavier spring therebehind, three fluid lines connected into said passageway, two of said lines being exposed to the spacing between the ends of said spool valve, the other of said lines being open to the space at the end of said valve adjacent said stop when said valve is in position of rest.

2. A sequence valve comprising a valve casing having a cylindrical opening therethrough, a spool valve in said opening a spring in said valve casing arranged to press said valve in one direction a resilient stop positioned to be engaged by said valve under pressure from said spring, said stop having a heavier spring therebehind, three fluid lines connected into said passageway, two of said lines being exposed to the spacing between the ends of said spool valve one head of said valve closing said casing between the said two lines and a third line when uninfluenced by fluid pressure, said lines having a by-pass to the end of said opening remote from said stop, the other of said lines being open to the space at the end of said valve adjacent said stop when said valve is in position of rest, said valve having sufficient amplitude of movement to expose said third line to the other two lines when moved in either direction from its position of rest.

3. A sequence valve comprising a valve casing having a cylindrical opening therethrough, a spool valve in said opening a spring in said valve casing arranged to press said valve in one direction a resilient stop positioned to be engaged by said valve under pressure from said spring, said stop having a heavier spring therebehind, three fluid lines connected into said passageway, two of said lines being exposed to the spacing between the ends of said spool valve one head of said valve closing said casing between the said two lines and a third line when uninfluenced by fluid pressure, said lines having a by-pass to the end of said opening remote from said stop, the other of said lines being open to the space at the end of said valve adjacent said stop when said valve is in position of rest, said valve being adapted to disconnect said third line from communication with the end of said valve and to establish connection between said third line and the other two lines when said valve is moved against said resilient stop, said valve having sufficient amplitude of movement being also adapted to move in a direction away from said stop thereby also uncovering said third line to said other lines.

4. A sequence valve comprising a valve casing having an opening longitudinally therethrough, a spool valve in said opening, said opening having an inlet line and an outlet line leading thereinto intermediate the ends of said valve, spring means maintaining said valve in stationary position toward one end of said opening, whereby fluid may flow from said inlet line through said outlet line, a second inlet line leading into said opening at the end of said valve opposite said spring, the fluid entering said second inlet line causing depression of said valve to connect said second inlet line with said outlet line and with the first named inlet line.

5. A sequence valve comprising a valve casing having an opening longitudinally therethrough, a spool valve in said opening, said opening having an inlet line and an outlet line leading thereinto intermediate the ends of said valve, spring means maintaining said valve in stationary position toward one end of said opening, means supplying fluid under pressure through said inlet line for an interval of time, a second inlet line leading into said opening at the end of said valve opposite said spring, means supplying fluid under pressure to said second inlet line upon cessation of the flow from the first named inlet line, said valve moving with the flow in said second inlet line against the resistance of said spring to connect said second inlet line with said outlet line.

6. A sequence valve comprising a valve casing having an opening longitudinally therethrough, a spool valve in said opening, said opening having an inlet line and an outlet line leading thereinto intermediate the ends of said valve, spring means maintaining said valve in stationary position toward one end of said opening, means supplying fluid under pressure through said inlet line for an interval of time, a second inlet line leading into said opening at the end of said valve opposite said spring, means supplying fluid under pressure to said second inlet line upon cessation of the flow from the first named inlet line, said valve moving with the flow in said second inlet line against the resistance of said spring to connect said second inlet line with said outlet line and with the first inlet line.

7. A sequence valve comprising a valve casing, a longitudinal bore therein, a piston valve mounted for movement in said bore, fluid passages connected to said bore at different points longitudinally thereof, said piston valve having a head closing said bore between said fluid passages, resilient means at each end of said piston for maintaining said piston valve normally in a position with its head closing said intermediate portion of said bore while permitting movement of said valve in both directions, and connections between certain of said passages and said valve bore at points near the end of the said bore for effecting the movement of said piston valve upon predetermined variations in pressure of the fluid in said passages.

8. A sequence valve comprising a valve casing, a longitudinal bore therein, a piston valve mounted for movement in said bore, fluid passages connected to said bore at different points longitudinally thereof, said piston valve having a head closing said bore between said fluid passages, a movable stop closing said bore at one end thereof, a spring holding said stop resiliently against the end of said bore, a second spring at the opposite end of said piston for normally holding said valve against said stop, and connections for transmitting fluid pressure to the opposite ends of said valve whereby said valve may be shifted in opposite directions by predetermined variations in said fluid pressures.

RACY D. BENNETT.